(12) United States Patent
Shoji

(10) Patent No.: US 6,516,266 B2
(45) Date of Patent: Feb. 4, 2003

(54) TRANSPORTATION METHOD FOR A SEMICONDUCTOR DEVICE AND TRANSPORTATION ROUTE SELECTION METHOD FOR A SEMICONDUCTOR DEVICE

(75) Inventor: Hiroo Shoji, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/800,010

(22) Filed: Mar. 6, 2001

(65) Prior Publication Data

US 2001/0053617 A1 Dec. 20, 2001

(30) Foreign Application Priority Data

Mar. 6, 2000 (JP) .................................. 2000-059848

(51) Int. Cl.$^7$ ................................................. G06F 7/00
(52) U.S. Cl. ..................... 701/202; 438/795; 414/935
(58) Field of Search ........................... 701/202, 201, 701/1; 438/795; 414/935; 416/98; 244/172

(56) References Cited

PUBLICATIONS

JP–abstract 2001250188 A—Sep. 14, 2001.*

* cited by examiner

Primary Examiner—William A. Cuchlinski, Jr.
Assistant Examiner—Olga Hernandez
(74) Attorney, Agent, or Firm—Robert J. Depke; Holland & Knight LLC

(57) ABSTRACT

Systems and methods are disclosed which reduce the occurrence of defects in semiconductor devices by selecting transportation routes for the semiconductor devices which reduce or minimize the amount of cosmic ray radiation to which the semiconductor devices are subjected during transportation. Cosmic radiation exposure is determined for a plurality of transportation routes and a route is selected which minimizes or reduces the radiation to which semiconductor devices are exposed during transportation.

8 Claims, 2 Drawing Sheets

TRANSPORTATION METHOD FOR A SEMICONDUCTOR DEVICE AND TRANSPORTATION ROUTE SELECTION METHOD FOR A SEMICONDUCTOR DEVICE

RELATED APPLICATION DATA

The present application claims priority to Japanese Application No. P2000-059848 filed Mar. 6, 2000, which application is incorporated herein by reference to the extent permitted by law.

BACKGROUND OF THE INVENTION

1. Field of the Invention

The present invention relates to a transportation method for a semiconductor device and a transportation route selection method for a semiconductor device which can prevent the occurrence of defects of a semiconductor device such as a solid state image device due to the transportation route.

2. Description of the Related Art

As one type of image defect in a solid state imaging device (charge coupled device: CCD) there are white defects at the time of a signal for darkness. This is usually separated into two types of modes. That is to say, one is a microscopic defect based on the defect level formed a microscopic amount of impurities, such as a heavy metal, which are mixed in during a process for a semiconductor, which is referred to as initial white defects. Though these initial white defects are the most important problem which affects yield during the manufacturing process, they can be removed before product shipment by carrying out measurement and selection.

On the contrary, the other defect mode are image defects (white defects) which usually occur among the selected good products after the completion assembly, measurement and selection, which are distinguished as white defects occurring after production. The white defects occurring after production exist among products shipped as good products and, therefore, this occurrence of defects is very critical which directly relates to the defects in all products into which a solid state imaging device has been built in.

As for the causes of the occurrence of the white defects occurring after production of a solid state imaging device, α rays in the packaging material or extrinsic cosmic rays are known. As for the α rays in the packaging material, measures are implemented by introducing materials in which the α ray concentration is as low as possible with respect to the materials utilized for a variety of packaging materials or during the wafer process.

For example, in the case where sealing glass used as a package for a solid state imaging device includes a radioactive element, such as uranium (U) or thorium (Th), the uranium (U) or the thorium (Th) α decay so as to generate α rays. When these α rays enter the solid state imaging device, the energy loss process thereof is divided into electronic energy loss and nuclear energy loss.

In the electronic energy loss process hole and electron pairs occur and, in the case of a solid state imaging device, this charge generates a spike of a customary dark current from pixels. And, in the case of a semiconductor memory, this charge due to the electronic energy loss causes a malfunction of the memory. This phenomenon is a so-called soft error.

And, in the nuclear energy loss, crystal defects of silicon occur, so that these crystal defects are fixed while generating a defect level in the silicon, and become permanent flaws. In the case of a solid state imaging device, the dark current in the pixels and transferring parts are increased.

SUMMARY OF THE INVENTION

With respect to white defects of a solid state imaging device, in the same manner as α rays, cosmic rays also cause defects. The amount of cosmic rays differs according to altitude and the higher the altitude is, the stronger the cosmic ray intensity becomes. For example, the cosmic ray concentration becomes 100 times, or more, as high as that on the ground in the vicinity of 10,000 m, which is an aircraft flight altitude. Therefore, the white defects of a solid state imaging device caused by exposure to cosmic rays during flight have become a critical issue.

In addition, the cosmic ray intensity differs according to the longitude of the location and that intensity distribution is similar to the distribution of the horizontal component of the geomagnetic force and is larger by one order, or more, in the polar regions than in the vicinity of the equator. Accordingly, in the case that a solid state imaging device is transported from Japan to Europe or to the U.S.A., a direct flight passing through the vicinity of the Arctic Circle has the problem that the effects of cosmic rays are significant because the flight passes through a region where the cosmic ray intensity is strong.

These cosmic rays are attenuated by passing them through a substance. However, the energy of the cosmic rays is of a high energy, with a unit of GeV, and is scarcely attenuated through a conventional package for transportation (cardboard boxes, thin duralumin trunks, or the like) which cannot be expected to have an effect against white defect occurrence.

The present invention is provided so as to solve such a problem. That is to say, the present invention is a transportation method for a semiconductor device which uses a transportation route where the cosmic ray concentration is the smallest among a plurality of transportation routes from a departure point to an arrival point at the time when a semiconductor device is transported from the departure point to the arrival point.

In addition, the present invention is also a transportation route selection method for a semiconductor device comprising the step of inputting a departure point and an arrival point for the transportation of a semiconductor device, the step of calculating a plurality of transportation routes from the departure point to the arrival point, the step of calculating the cosmic ray concentration in each of the plurality of transportation routes and the step of selecting the transportation route where the cosmic ray concentration is the smallest among the plurality of transportation routes.

In the present invention configured as above, since the transportation route where the cosmic ray concentration is the smallest is selected from among transportation routes for a semiconductor device, the amount of exposure to the cosmic rays during the transportation of a semiconductor device can be restricted to the minimum so that the white defects which used to occur at the time of transportation can be reduced to a great extent.

DESCRIPTION OF THE PREFERRED EMBODIMENT

Figure 1:
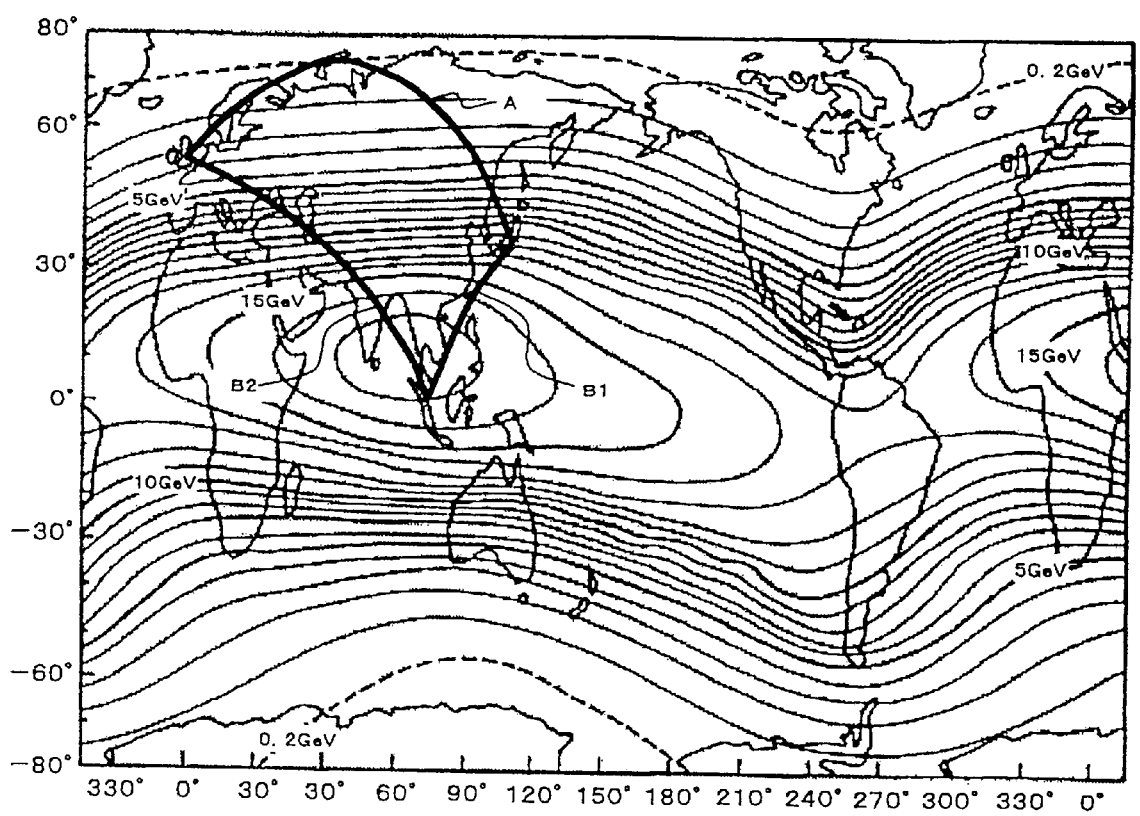
FIG. 1 is a view showing a geographical distribution of the geometric field cutoff rigidity.

In the following, an embodiment of the present invention is described in reference to the drawings. FIG. 1 is a view showing a geographic distribution of the geometric field cutoff rigidity of primary cosmic rays entering in the perpendicular direction. Here, the geometric field cutoff rigidity (GeV) is the minimum energy of the primary cosmic rays entering in the perpendicular direction which can reach the surface of the earth and the rays with the energy of the cutoff rigidity, or less, do not reach the surface of the earth.

Since the primary cosmic rays consist mainly of charged particles, such as protons, they are influenced by the geomagnetism. Therefore, the intensity distribution of the primary cosmic rays on the surface of the earth is similar to the horizontal component of the geomagnetic force so as to change depending on geometric field cutoff rigidity at the location. Accordingly, the cosmic ray concentration in polar regions where the geometric field cutoff rigidity is small is larger by one order, or more, than that in the vicinity of the equator. In addition, because of the similar intensity distribution at the flight altitude to that on the surface of the earth, the cosmic ray concentration in the sky of the polar regions is higher by one order, or more, than the sky in the vicinity of the equator.

Then, a transportation method for a semiconductor device according to the embodiment is characterized in that the transportation route where the cosmic ray concentration is the smallest (transportation route where the geometric field cutoff rigidity is large) is used by selecting from among a plurality of transportation routes, between the departure point and the arrival point.

That is to say, in the case that a semiconductor device such as a solid state imaging device or a CMOS sensor is transported from Japan to Europe or to the U.S.A., a direct flight that passes through the vicinity of the Arctic Circle goes through regions where the cosmic ray concentration is high and is influenced by the cosmic rays to a particularly great extent. Therefore, in the embodiment, a transportation route which goes through regions where the cosmic ray concentration is low (regions where the geometric field cutoff rigidity is large) is used as opposed to a direct flight passing through the vicinity of the Arctic Circle. Thereby, even though the transportation time becomes slightly longer, the amount of exposure to the cosmic rays of the semiconductor device can be reduced so that the white defects occurring at the time of transportation can be reduced to a great extent.

Next, a concrete example is described. Here, a transportation method (air route) from Tokyo to the U.K. (London) is cited as an example. As shown by bold lines in FIG. 1, as for the transportation route from Tokyo to London, there is the transportation route A which is the direct flight passing, mainly, through the vicinity of the Arctic Circle and there is the transportation route B1+B2 passing through Singapore, which is located closer to the equator than Tokyo.

Among these, the flight time for the transportation route A, which is the direct flight from Tokyo to London, is 12 hours, the flight time of the transportation route B1 from Tokyo to Singapore is 7 hours and the flight time for the transportation route B2 from Singapore to London is 14 hours. Accordingly, the flight time for the transportation route A is 12 hours and the flight time for the transportation route B1+B2 becomes 21 hours.

On the other hand, the amounts of exposure to the cosmic rays of the transportation route A and the transportation route B1+B2 are compared according to the distribution of the geometric field cutoff rigidity, as shown in FIG. 1, so as to find that the amount of exposure to the cosmic rays of the transportation route B1+B2 is 0.5 times as large as that of the transportation route A. That is to say, though the flight time for the transportation route B1+B2 is 1.75 times as long as that for the transportation route A, the amount of exposure to the cosmic rays of the transportation route B1+B2 is 0.5 times as large as that of the transportation route A. In the embodiment, a semiconductor device is transported by the transportation route B1+B2 because of the amount of exposure to cosmic rays as described above.

A solid state imaging device is actually transported by the transportation route A and by the transportation route B1+B2 and the rate of occurrence of white defects is examined so as to find that the rate of occurrence of white defects during the transportation route B1+B2 is reduced by 50% in comparison with that during the transportation route A.

Next, a transportation route selection method for a semiconductor device according to the embodiment is described. This method is implemented mainly through a program process carried out by a computer, or the like.

Figure 2:
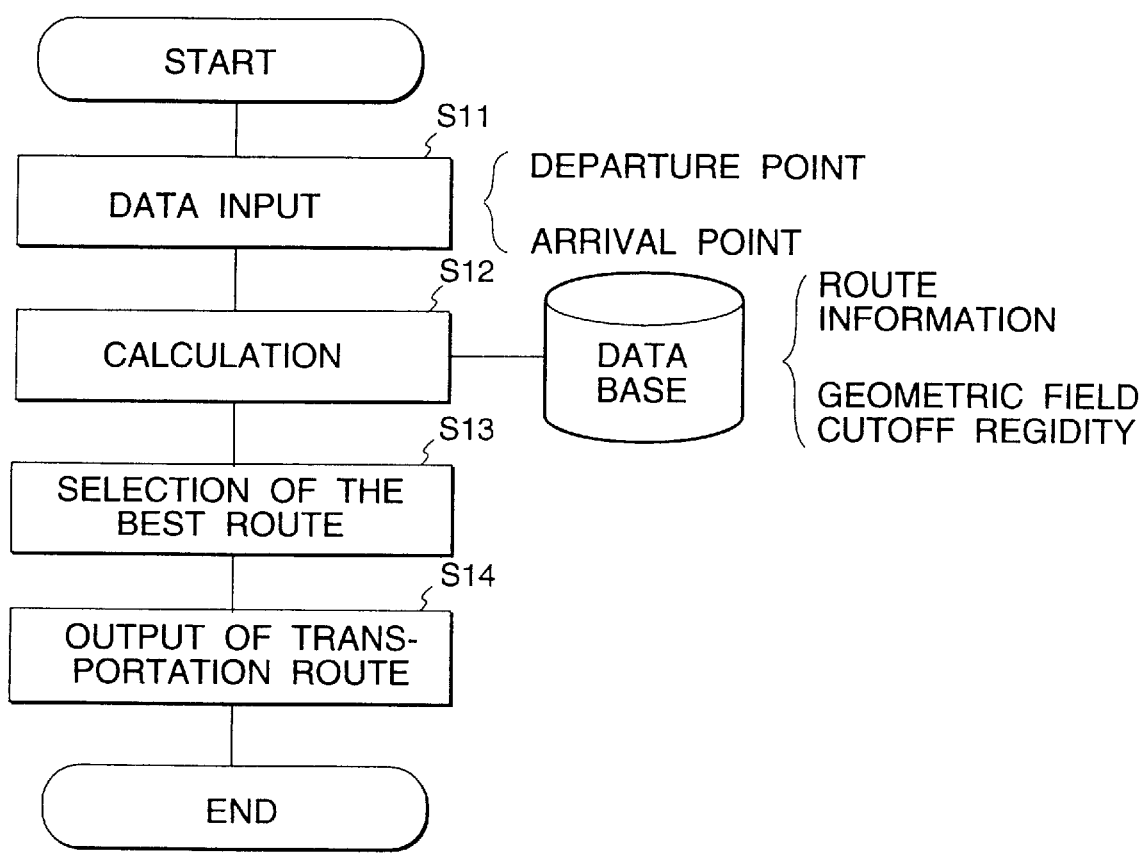
FIG. 2 is a flow chart for describing a transportation route selection method.

FIG. 2 is a flow chart describing a transportation route selection method according to the embodiment. First, the departure point and the arrival point of the transportation of a semiconductor device are inputted (Step S11). Then, based on route information stored in a data base, the transportation routes from the departure point to the arrival point are calculated by using the flight routes presently in service (Step S12).

In addition, at the same time as the calculation of the transportation routes, the amounts of exposure to the cosmic rays in the case that those transportation routes are used are calculated based on the geometric field cutoff rigidity. This calculation is described below.

Next, in the case where a plurality of transportation routes exist from the departure point to the arrival point, the transportation route is selected where the amount of exposure to cosmic rays, which has been previously calculated for each transportation route, is the smallest (Step S13). Then, the selected transportation route is determined, as the transportation route for a semiconductor device, and is outputted on a display, or the like (Step S14).

Here, among the operations carried out in Step S12, the calculation of the amount of exposure to cosmic rays corresponding to a transportation route is described. First, as a presupposition of the calculation, flux profiles (energy/amount) of neutrons (n) and protons (p+) exhibit the same behavior and the flux profile of the neutrons (n) of 1 to 10 MeV is analogous to those of 1 to 1000 MeV while the flux profile of protons (p+) of 1 to 10 MeV is analogous to those of 1 to 1000 MeV and, therefore, the amount of cosmic rays at the flight altitude is represented by the flux of neutrons (n) of 1 to 10 MeV.

In addition, for the purpose of the simplification of the calculation, the flight altitude is assumed to be Quonset hut-shaped, reaching 10000 m immediately after departure, and after that, is constant at 10000 m. Furthermore, solar activity is assumed to be at the minimum (amount of cosmic rays is at the maximum).

In the calculation of the amount of cosmic rays, the geomagnetic longitude effect at the flight altitude is taken into consideration so that the transportation (flight) route is divided into one hour segments and the flux ($n/cm^2/sec$) of neutrons (n) at the flight altitude (10000 m) is found from the geometric field cutoff rigidity on the surface of the earth, according to the route the flight covers during each flight hour and, after that, the flux of neutrons (n) of each flight hour is totaled up.

Such a calculation is carried out for the transportation route A (see FIG. 1) which is the direct flight (here the shortest distance according to the zenithal method) from Tokyo to London and for the transportation route B1+B2 which departs from Tokyo, takes the southern route passing through Singapore and heads to London, so that the total dose of cosmic rays (neutrons (n) and protons (p+) of the primary cosmic rays + secondary cosmic rays) is calculated.

As a result, though the cosmic ray concentration changes due to a variety of conditions, such as the influence of solar activity or changes in flight altitude influenced by the weight of the fuel load, the amount of exposure to cosmic rays is reduced by 50% in the transportation route B1+B2 in comparison with transportation route A.

In addition, similar calculations are carried out for other transportation routes from Tokyo to London, as shown in the following.

Transportation route C . . . Tokyo→Kuala Lumpur→London
Transportation route D . . . Tokyo→Bangkok→London
Transportation route E . . . Tokyo→Manila→London
Transportation route F . . . Tokyo→Jakarta→London
Transportation route G . . . Tokyo→Sri Lanka→London
Transportation route H . . . Tokyo→Hong Kong→London The respective amounts of exposure to cosmic rays are calculated for the transportation routes including previously shown transportation route A and transportation route B1+B2, in addition to the above transportation routes C to H so as to find that the routes through Singapore (transportation route B1+B2) and through Kuala Lumpur (transportation route C) wherein passage through the region where the geometric field cutoff rigidity is large (cosmic ray concentration is small) is comparatively long are particularly excellent (amount of exposure cosmic rays is small).

Here, in the case that the amount of exposure to cosmic rays is of a similar degree, the transportation route may be selected by taking convenience (transportation cost, number of flights, or the like) into consideration.

In addition, as another example of a transportation route from Tokyo to London, the route of Tokyo→Seoul→London can be considered. In the case of the route through Seoul, even though it is a flight through Asia, the region where the geometric field cutoff rigidity is small (cosmic ray concentration is high) is passed through and, therefore, the amount of exposure to cosmic rays becomes large in comparison with the route through Singapore.

In addition, as an example with another departure point and arrival point, a calculation is carried out for transportation from Fukuoka to San Francisco in the same manner as the above so as to discover that the amount of exposure to cosmic rays in the transportation route of Fukuoka→Tokyo→Honolulu→San Francisco is reduced by 40% in comparison with the transportation route of Fukuoka→Seoul→San Francisco.

Furthermore, as an example with another departure point and arrival point, a calculation is carried out for transportation from Sidney to Johannesburg in the same manner as the above so as to discover that the route through regions in the Southern Hemisphere, where the geometric field cutoff rigidity is larger (cosmic ray concentration is lower), has a smaller amount of exposure to cosmic rays in the same manner as in the Northern Hemisphere. Accordingly, the transportation route of Sidney→Singapore→Johannesburg has a smaller amount of exposure to cosmic rays than the direct flight from Sydney to Johannesburg.

Here, in the above described embodiment, though all of the cases that are described relate to the usage of air routes, the present invention is not restricted to this and the cases of the usage of land routes or sea routes, as well as the case of the use of combinations of land routes, sea routes and air routes, are applicable in the same manner.

As described above, according to the present invention, in the transportation of a semiconductor device, such as a solid state imaging device, by selecting a transportation route wherein the amount of exposure to cosmic rays becomes small, rather than by selecting a transportation route in which the transportation time is merely short, it becomes possible to reduce defects in semiconductor devices occurring after production to a great degree. Thereby, it becomes possible to increase the reliability of semiconductor devices and products incorporating the same.

What is claimed is:

1. A transportation method for a semiconductor device characterized in that, in transporting a semiconductor device from a departure point to an arrival point, the transportation route wherein the cosmic ray concentration is the smallest is used from among a plurality of transportation routes from the departure point to the arrival point.

2. A transportation method for a semiconductor device according to claim 1, characterized in that said cosmic ray concentration determined is based on the geomagnetic field cutoff rigidity.

3. A transportation method for a semiconductor device according to claim 1, characterized in that said cosmic ray concentration is determined by taking the transportation altitude of each of said plurality of transportation routes into consideration.

4. A transportation route selection method for a semiconductor device, characterized by comprising:

the step of inputting a departure point and an arrival point for the transportation of a semiconductor device;

the step of calculating a plurality of transportation routes from said departure point and said arrival point;

the step of calculating the cosmic ray concentration of each of said plurality of transportation routes; and the step of selecting the transportation route wherein said cosmic ray concentration is the smallest from among said plurality of transportation routes.

5. A transportation route selection method for a semiconductor device according to claim 4, characterized in that, in calculating the cosmic ray concentration of each of said plurality of transportation routes, that cosmic ray concentration is calculated based on the geomagnetic field cutoff rigidity.

6. A transportation route selection method for a semiconductor device according to claim 4, characterized in that, in calculating the cosmic ray concentration of each of said plurality of transportation routes, the calculation is carried out by taking into consideration the transportation altitude of each transportation route.

7. A method of selecting a transportation route for a semiconductor device comprising the steps of:

identifying a plurality of transportation routes for a semiconductor device and identifying an amount of cosmic radiation to which the semiconductor device will be subjected for each of said routes; and thereafter selecting a transportation route which will result in a reduced exposure to cosmic radiation for the semiconductor device compared with the highest amount of cosmic radiation for the plurality of transportation routes.

8. The method of selecting a transportation route for a semiconductor device of claim 7, further comprising the step of selecting a transportation route with a lowest level of cosmic radiation.

* * * * *